United States Patent Office 2,981,736
Patented Apr. 25, 1961

2,981,736

IMINODIBENZYL DERIVATIVES

Paul Gailliot, Paris, and Jacques Gaudechon, Thiais, France, assignors to Societe des Usines Chimiques Rhone-Poulenc, Paris, France, a corporation of France No Drawing. Filed June 24, 1959, Ser. No. 822,442

Claims priority, application France June 30, 1958

8 Claims. (Cl. 260—268)

This invention relates to new derivatives of iminodibenzyl.

It is an object of the present invention to provide new iminodibenzyl derivatives which possess useful pharmacological properties. Further objects of the invention are to provide processes for their preparation, and pharmaceutical compositions containing them.

The iminodibenzyl derivatives of the present invention are those which conform to the general formula:

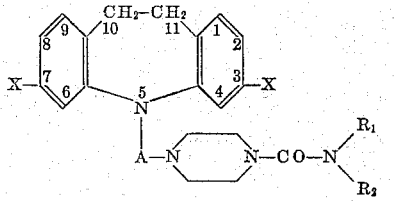

I (wherein A represents a divalent straight or branched saturated aliphatic hydrocarbon group containing 2 to 4 carbon atoms with at least two carbon atoms between the nitrogen atom of the iminodibenzyl nucleus and that of the piperazine nucleus, the symbols X represent hydrogen atoms or identical halogen atoms, $R_1$ and $R_2$ are the same or different and each represents a hydrogen atom or a lower alkyl group, and one or more of the carbon atoms of the piperazine nucleus may carry a lower alkyl group) and their acid addition and quaternary ammonium salts. By the term "lower alkyl" as used in this specification and accompanying claims is meant alkyl groups containing not more than four carbon atoms. The hydrocarbon group A may be, for example, any of the following groups:

$$-(CH_2)_2-,\ -CH_2-CH-,\ -(CH_2)_3-,\ -CH-(CH_2)_2-$$
$$\qquad\qquad\qquad\quad\ \ |\qquad\qquad\qquad\quad\ \ |$$
$$\qquad\qquad\qquad\ \ CH_3\qquad\qquad\qquad\ CH_3$$

$$-CH_2-CH-CH_2-,\ -(CH_2)_4-$$
$$\qquad\quad\ \ |$$
$$\qquad\ \ CH_3$$

These new iminodibenzyl compounds may be prepared by the application of known methods for the conversion of iminodibenzyl and its C-substituted products into the corresponding 5-aminoalkyl-iminodibenzyls. Such methods when so applied can be defined generically as comprising the interaction of an iminodibenzyl of the formula:

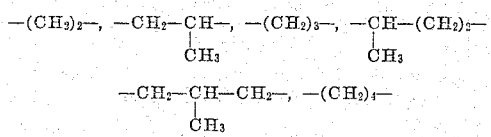

II with a compound Q, the P and the compound Q being such that they will interact to introduce or form in the 5-position of the ring a substituent grouping of the structure:

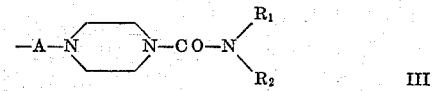

III (wherein the symbols A, X, $R_1$ and $R_2$ are as hereinbefore defined and one or more of the carbon atoms of the piperazine nucleus may carry a lower alkyl group). By the term "known methods" as used in this specification is meant methods heretofore employed or described in the chemical literature.

Preferred processes of manufacture are as follows:

(1) Interaction of an iminodibenzyl of the general formula:

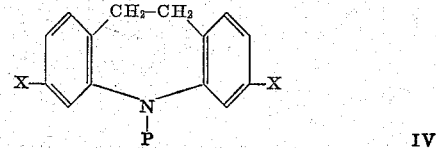

IV with a piperazine derivative of the general formula:

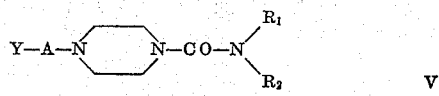

V wherein Y represents the acid residue of a reactive ester, such as a halogen atom or a sulphuric ester residue, the other symbols are as hereinbefore defined, and one or more of the carbon atoms of the piperazine nucleus may carry a lower alkyl group.

The reaction may be effected with or without a solvent in the presence or absence of a condensing agent. It is advantageous to use a solvent of the group of aromatic hydrocarbons (for example, toluene or xylene) ethers (for example, diethyl ether) or tertiary amides (for example, dimethylformamide) in the presence of a condensing agent preferably of the class of alkali metals and their derivatives (such as, for example, hydrides, amides, hydroxides, alcoholates, metal alkyls or aryls) and, more particularly, metallic sodium or potassium, sodamide, powered sodium or potassium hydroxide, lithium or sodium hydride, sodium tert-butoxide, butyllithium, phenyllithium or phenylsodium. The reaction is preferably carried out at the boiling temperature of the solvent using sodamide as condensing agent. It is particularly advantageous to use a reactive ester of Formula V in the form of the free base in solution in, for example, benzene, toluene or xyleene and to add it to the mixture of other reagents wherein the iminodibenzyl employed may already be present, in part at least, in the form of an alkali metal salt. The reaction may also be effected with a salt of the reactive ester but in this case a greater proportion of the condensing agent must be used in order to neutralize the acid of the salt employed.

In the case where the divalent aliphatic hydrocarbon group —A— is an asymmetric branched chain, such as for example as

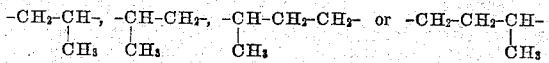

isomerisation can take place during the course of the reaction with the formation of a mixture of isomers. Separation of the isomers may be effected by, for example, fractional crystallisation of salts such as the hydrochlorides from a suitable solvent such as an alcohol.

(2) Interaction of an iminodibenzyl of the general formula:

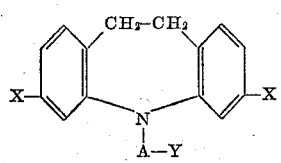

with a piperazine derivative of the general formula:

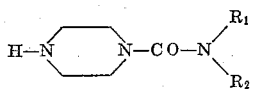

wherein the various symbols are as hereinbefore defined, and one or more of the carbon atoms of the piperazine nucleus may carry a lower alkyl group. The reaction is preferably effected in an inert organic medium, for example, in a solvent such as an alcohol.

(3) Interaction of piperazinylalkylaminodibenzyl of the general formula:

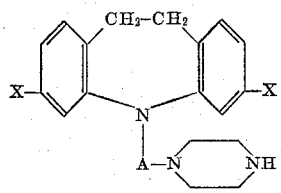

(wherein A and X are as hereinbefore defined and one or more of the carbon atoms of the piperazine nucleus may carry a lower alkyl group) with a carbamoyl halide of the formula

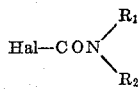

(wherein Hal represents a halogen atom, preferably chlorine, and $R_1$ and $R_2$ are as hereinbefore defined), isocyanic acid or an alkali metal salt thereof, methyl isocyanate or urea. Reaction with isocyanic acid, or an alkali metal salt thereof, or urea gives a product conforming to Formula I in which $R_1$ and $R_2$ are hydrogen atoms; reaction with methyl isocyanate gives a product in which one of $R_1$ and $R_2$ is a hydrogen atom and the other is a methyl group.

The reaction with carbamoyl halide may be effected by heating the reagents in chloroform or an aromatic hydrocarbon solvent such as benzene or toluene optionally in the presence of a tertiary base such as pyridine, preferably at the boiling temperature of the solvent. The reaction with alkali metal isocyanate may be effected at room temperature in aqueous solution with an acid addition salt (e.g. dihydrochloride) of the piperazinylalkyliminodibenzyl. The reaction with methyl isocyanate may be effected at a temperature below 40° C. with the reagents in solution in an aromatic hydrocarbon solvent. The reaction with urea may be effected by heating the reagents under a current of nitrogen at a temperature between 120° and 180° C.

The new iminodibenzyl derivatives of Formula I may be converted in manner known per se into acid addition salts and quarternary ammonium derivatives. The acid addition salts may be obtained by the action of acids on the iminodibenzyl derivatives in appropriate solvents. As organic solvents there may be used, for example, alcohols, ethers, ketones or chlorinated hydrocarbons; water may advantageously be used as an inorganic solvent. The salt which is formed is precipitated, if necessary after concentration of its solution, and is separated by filtration or decantation. The quaternary ammonium derivatives may be obtained by the action of esters on the iminodibenzyl derivatives, optionally in an organic solvent, at room temperature or, more rapidly, with gentle heating.

The new iminodibenzyl derivatives of the present invention possess valuable pharmacodynamic properties; in particular, they are antiemetics, psychotonics, decontracturants, e.g. centrally active muscle relaxants, and anti-Parkinsonians. The iminodibenzyl derivatives which possess outstanding utility in the aforesaid respects are those in which the hydrocarbon chain A is —(CH$_2$)$_3$— or

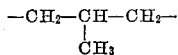

Of outstanding importance is 5-(3-4'-carbamoyl-1'-piperazinylpropyl)iminodibenzyl. Other compounds of importance are 5-(3-4'-methylcarbamoyl-1'-piperazinylpropyl)-iminodibenzyl, 5-(3-4'-dimethylcarbamoyl-1'-piperazinylpropyl)iminodibenzyl, 3,7-dichloro-5-(3-4'-carbamoyl-1'-piperazinylpropyl)iminodibenzyl, 3,7-dichloro-5-(3-4' - methylcarbamoyl - 1' - piperazinylpropyl)iminodibenzyl, 5-(3-2',5'-dimethyl-4'-carbamoyl-1'-piperazinylpropyl)-iminodibenzyl and 5-(3-4'-carbamoyl-1'-piperazinyl-2-methylpropyl)iminodibenzyl.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, oxalates, tartrates, methanesulphonates, ethanedisulphonates, chlorotheophyllinates, theophylline-acetates, salicylates, phenophthaleinates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl chloride, bromide or iodide) or other reactive esters, e.g. methyl or ethyl sulphate or toluene-p-sulphonate.

The following examples illustrate the invention.

*Example I*

To a solution of 5-(3-1'-piperazinylpropyl)iminodibenzyl dihydrochloride (19.7 g.) in distilled water (150 cc.) is added a solution of potassium cyanate (5.4 g.) in distilled water (10 cc.). The solution is agitated for 18 hours at 20° C., then sodium hydroxide (d.=1.33, 10 cc.) is added. The base which separates is extracted with chloroform (4 x 50 cc.). The chloroform solution is washed with distilled water (100 cc.), then dried over anhydrous sodium sulphate and evaporated to dryness in vacuo. The residue is dissolved in boiling ethyl acetate (100 cc.) then filtered and cooled in ice water with agitation. The crystals formed are filtered off, washed with ethyl acetate (10 cc.) and dried at 45° C. in vacuo. There is obtained 5-(3-4'-carbamoyl-1'-piperazinylpropyl)iminodibenzyl (14.35 g.), M.P. 134–136° C.

*Example II*

To a solution of 5-(3-1'-piperazinylpropyl)iminodibenzyl (10.1 g.) in anhydrous toluene (50 cc.) is added over ten minutes a solution of methyl isocyanate (4 g.) in anhydrous toluene (20 cc.). The solution is agitated for 18 hours at 20° C. then cooled in ice water. The crystals formed are filtered off, washed with toluene (10 cc.) then with cyclohexane (20 cc.). The crystals are dissolved in boiling ethyl acetate (65 cc.) and the hot solution is filtered, then cooled in ice water. The crystals are filtered off, washed with ethyl acetate (10 cc.) and then with cyclohexane (20 cc.) and dried in vacuo at 45° C. There is obtained 5-(3-4'-methylcarbamyl-1'-piperazinylpropyl)iminodibenzyl (7.4 g.), M.P. 140–142° C.

*Example III*

A solution of 5-(3-1'-piperazinylpropyl)iminodibenzyl (9.05 g.) in chloroform (100 cc.) is treated with anhydrous pyridine (2.45 g.) and then with dimethylcarbamoyl chloride (3.65 g.). The mixture is boiled under reflux for one hour. After cooling, normal sodium hydroxide (50 cc.) is added. The solution is agitated for 10 minutes and the aqueous layer is then separated. The chloroform solution is washed with distilled water (100 cc.), then dried over anhydrous sodium sulphate. The solvent is removed in vacuo. There is obtained crude 5-(3-4-dimethylcarbamoyl - 1' - piperazinylpropyl)iminodibenzyl (11 g.), the acid maleate of which crystallised from ethyl acetate, melts at 138–140° C.

The initial 5-(3-1'-piperazinylpropyl)iminodibenzyl is prepared as follows:

A solution of iminodibenzyl (78 g.) in anhydrous xylene (500 cc.) is heated to 90° C., then treated with sodamide (18.7 g.) and heated to 120° C. A solution of 1-3'-chloropropyl-4-formylpiperazine (84 g.) in anhydrous xylene (100 cc.) is then run in over one hour and 40 minutes. The addition completed, heating is continued at about 120° C. for 5 hours. After cooling, distilled water (250 cc.) is added, the solution is agitated for 10 minutes and the aqueous layer is then separated. The organic solution is extracted with an aqueous solution of 33% hydrochloric acid (3 x 140 cc., d.=1.19). The hydrochloric acid solution is boiled under reflux for 4 hours and, after cooling, is made alkaline to phenolphthalein with sodium hydroxide (150 cc., d.=1.33). The base which separates is extracted with toluene (500 cc.), then with chloroform (200 cc.). The organic solution is dried over anhydrous sodium sulphate. The solvents are driven off in vacuo and the residue is distilled. There is obtained 5-(3-1'-piperazinylpropyl)iminodibenzyl (64 g.) B.P. 215–230° C./0.25 mm. Hg, the dihydrochloride of which, crystallised from ethanol, melts at about 220° C.

Example IV

To a solution of 5-(2-1'-piperazinylethyl)iminodibenzyl (9.5 g.) in distilled water (75 cc.) is added a solution of potassium cyanate (2.7 g.) in distilled water (10 cc.). The solution is agitated for 18 hours at 20° C. then sodium hydroxide (5 cc., d.=1.33) is aded. The base which separates is extracted with chloroform (3 x 50 cc.) and the chloroform solution is washed with distilled water (50 cc.), then dried over anhydrous sodium sulphate and evaporated to dryness in vacuo. The residue is dissolved in boiling ethyl acetate (95 cc.), filtered and then cooled in ice water with agitation. The crystals formed are filtered off, washed with ethyl acetate (10 cc.) and then dried at 45° C. in vacuo. There is obtained 5 - (2-4' - carbamyl - 1' - piperazinylethyl)iminodibenzyl (5.7 g.), M.P. 157–159° C.

The initial 5-(2-'-piperazinylethyl)iminodibenzyl (B.P. 220–230° C./0.8 mm. Hg) the dihydrochloride of which, crystallised from ethanol, melts at about 220° C., is prepared by the action of 1-(2-chloroethyl)-4-acetylpiperazine on iminodibenzyl in toluene in the presence of sodamide followed by deacetylation by boiling with dilute hydrochloric acid of the product obtained.

Example V

A solution of 5-(2-1'-piperazinylethyl)iminodibenzyl (9.45 g.) in anhydrous toluene (60 cc.) is treated with a solution of methyl isocyanate (4 cc.) in anhydrous toluene (20 cc.). The solution is agitated for 18 hours at 20° C. then cooled in ice water. The crystals formed are filtered off, washed with toluene (10 cc.) then with cyclohexane (20 cc.). The crystals are dissolved in boiling ethyl acetate (65 cc.), and the hot solution is filtered then cooled in ice water. The crystals are filtered off, washed with ethyl acetate (10 cc.) then with cyclohexane (20 cc.) and dried in vacuo at 45° C. There is obtained 5 - (2 - 4' - methylcarbamoyl - 1' - piperazinylethyl)imindodibenzyl (8.2 g.), M.P. 145–148° C.

Example VI

Proceeding as in Example IV but starting from 3,7-dichloro-5-(2-1'-piperazinylethyl)iminodibenzyl (7.2 g.) in solution in N hydrochloric acid (38 cc.) and potassium cyanate (2.1 g.), there is obtained 3,7-dichloro-5-(2-4'-carbamoyl-1'-piperazinylethyl)iminodibenzyl (3.8 g.), M.P. 198–200° C.

The initial 3,7-dichloro-5-(2-1'-piperazinylethyl)iminodibenzyl, the dimaleate of which, crystallised from ethanol, melts at 162–164° C., is prepared by the action of 1-(2-chloroethyl)-4-acetylpiperazine on 3,7-dichloroiminodibenzyl in toluene in the presence of sodamide followed by deacetylation by boiling with dilute hydrochloric acid of the product obtained.

Example VII

Proceeding as in Example IV, but starting from 3,7-dichloro-5-(3-1'-piperazinylpropyl)iminodibenzyl dihydrochloride (8.6 g.) and potassium cyanate (1.7 g.), there is obtained 3,7 - dichloro - 5 - (3 - 4'-carbamoyl - 1'-piperazinylpropyl)iminodibenzyl (2.3 g.), M.P. 118–120° C.

The initial 3,7-dichloro-5-(3-1'-piperazinylpropyl)-iminodibenzyl, the dimaleate of which, crystallised from ethanol, melts at about 185° C., is prepared by the action of 1-(3-chloropropyl)-4-acetylpiperazine on 3,7-dichloroiminodibenzyl in toluene in the presence of sodamide followed by deacetylation by boiling with dilute hydrochloric acid of the product obtained.

Example VIII

Proceeding as in Example V, but starting from 3,7-dichloro-5-(3-1'-piperazinylpropyl)iminodibenzyl (9.43 g.) and methyl isocyanate (4 cc.) there is obtained 3,7 - dichloro - 5(3 - 4' - methylcarbamoyl - 1' - piperazinylpropyl)iminodibenzyl (7.4 g.), M.P. 190—192° C.

Example IX

Proceeding as in Example IV but starting from 5-(4-1'-piperazinylbutyl)iminodibenzyl dihydrochloride (20.4 g.) and potassium cyanate (4.9 g.), there is obtained 5 - (4 - 4' - carbamoyl - 1' - piperazinylbutyl)iminodibenzyl (10.35 g.), M.P. about 90° C.

The initial 5-(4-1'-piperazinylbutyl)iminodibenzyl, the dihydrochloride of which, crystallised from ethanol, melts at about 200° C., is prepared as follows:

A solution of iminodibenzyl (97.5 g.) in anhydrous toluene (500 cc.) is heated to 90° C., then treated with sodamide (23.4 g.). The solution is heated to 110° C., then a solution of 1-chloro-4-tetrahydropyranyloxybutane (115.5 g.) in anhydrous toluene (150 cc.) is added over one hour. The addition completed, heating is continued at about 110° for five hours. After cooling, distilled water (300 cc.) is added, the solution is agitated for 10 minutes and the aqueous layer is decanted. The toluene solution is treated with ethanol (2,900 cc.) and hydrochloric acid (4.5 cc.) diluted to 25% of acid (d.=1.19). The solution is left to stand for two hours at 20° C., then evaporated to dryness in vacuo. The residue is dissolved in chloroform (1 litre) and the chloroform solution is washed with distilled water (4 x 300 cc.), then dried over anhydrous sodium sulphate. The chloroform is removed then the residue is distilled in vacuo. There is obtained 5-(4-hydroxybutyl)iminodibenzyl (106.5 g.), B.P. 215° C./0.4 mm. Hg.

A solution of 5-(4-hydroxybutyl)iminodibenzyl (106.5 g.) in anhydrous pyridine (500 cc.) is cooled in ice water to +3° C. Toluene-p-sulphonyl chloride (74.5 g.) is added to the solution over 20 minutes. The mixture is left to stand for 18 hours at about 0° C. then ice water (2.5 kg.) is added. The product which separates is extracted with ether (1 liter). The ethereal solution is washed successively with ice water (500 cc.), N hydrochloric acid (250 cc.) and then with ice water (2 x 500 cc.), and is then dried over anhydrous sodium sulphate and evaporated to dryness in vacuo. There is obtained 5-(4-toluene-p-sulphonyloxybutyl)iminodibenzyl (135 g.).

A solution of 5-(4-toluene-p-sulphonyloxybutyl)iminodibenzyl (93 g.) and anhydrous piperazine (95 g.) in anhydrous toluene (1 litre) is boiled under reflux for 4 hours. After cooling, distilled water (300 cc.) is added, the solution is agitated for 5 minutes then the aqueous layer is decanted. The toluene solution is washed with distilled water (2 x 600 cc.), then extracted with hydrochloric acid (600 cc.) diluted to 10% of acid (d.=1.19). The hydrochloric acid solution is made alkaline with sodium hydroxide (d.=1.33) and the base which separates is extracted with chloroform (500 cc.). The chloroform solution is dried over anhydrous sodium sulphate then evaporated to dryness. The residue is distilled in vacuo. There is obtained 5-(4-1'-piperazinylbutyl)iminodibenzyl (50 g.), B.P.=240° C./0.7 mm. Hg.

*Example X*

Proceeding as in Example IV but starting with 5-(2-1' - piperazinylpropyl)iminodibenzyl dihydrochloride (14.45 g.) and potassium cyanate (3.5 g.), there is obtained 5-(2-4'-carbamoyl-1'-piperazinylpropyl)iminodibenzyl, (6.8 g.), M.P. 141–142° C.

The initial 5-(2-1'-piperazinylpropyl)iminodibenzyl is prepared in manner analogous to the preparation of 5-(4-1'-piperazinylbutyl)iminodibenzyl described in Example IX, i.e. as follows:

By the action of 1-chloro-2-tetrahydropyranyloxypropane on iminodibenzyl in toluene in the presence of sodamide, there is obtained 5-(2-hydroxypropyl)iminodibenzyl, B.P.=188–198° C./0.6 mm. Hg.

By the action of toluene-p-sulphonyl chloride on 5-(2-hydroxypropyl)iminodibenzyl, there is obtained 5-(2-toluene-p-sulphonyloxypropyl)iminodibenzyl which, on heating with anhydrous piperazine in toluene, gives 5-(2-1'-piperazinylpropyl)iminodibenzyl, the dihydrochloride of which, crystallised from ethanol, melts at about 210° C.

*Example XI*

Proceeding as in Example IV but starting from 5-(3-2',5'-dimethyl-1'-piperazinylpropyl)iminodibenzyl dihydrochloride (10.8 g.) and potassium cyanate (2.7 g.), there is obtained 5-(3-2',5'-dimethyl-4'-carbamoyl-1'-piperazinylpropyl)iminodibenzyl (8.05 g.), M.P. 168–170° C.

The initial 5-(3-2',5'-dimethyl-1'-piperazinylpropyl)-iminodibenzyl, the dihydrochloride of which, crystallised from ethanol, melts at about 190° C., is prepared by the action of 5-(3-toluene-p-sulphonyloxypropyl)iminodibenzyl on 2,5-dimethylpiperazine in anhydrous toluene.

*Example XII*

To a solution of 5-(3-1'-piperazinyl-2-methylpropyl)-iminodibenzyl (12 g.) in N hydrochloric acid (70 cc.) is added a solution of potassium cyanate (3.3 g.) in distilled water (8 cc.). The solution is agitated for 18 hours at 20° C. then sodium hydroxide d.=1.33, 7 cc.) is added. The base which separates is extracted with chloroform (130 cc. in two lots) and the chloroform solution is dried over anhydrous sodium sulphate, then evaporated to dryness in vacuo. After crystallisation of the residue from ethyl acetate (70 cc.), there is obtained 5-(3-4'-carbamoyl - 1' - piperazinyl - 2 - methylpropyl)iminodibenzyl (4.1 g.), M.P. 157–158° C.

The initial 5-(3-1'-piperazinyl-2-methylpropyl)iminodibenzyl (B.P. 228–265° C./0.8 mm. Hg) is prepared by the action of 1-acetyl-4-(3-chloro-2-methylpropyl)-piperazine on iminodibenzyl in toluene in the presence of sodamide followed by deacetylation by boiling with dilute hydrochloric acid of the product obtained.

The present invention further includes within its scope pharmaceutical compositions which comprise one or more compounds of general Formula I or their acid additional or quaternary ammonium salts together with a significant amount of a pharmaceutical carrier. The invention includes especially such compositions made up for oral, rectal, or parenteral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emultions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the dosage should be between 0.1 and 10 mg. per kilogram of weight of the animal to be treated.

The following example illustrates pharmaceutical compositions according to the invention.

*Example XII*

Tablets are prepared having the following compositions:

| | G. |
|---|---|
| 5-(3-4'-carbamoyl - 1' - piperazinylpropyl)iminodibenzyl | 0.025 |
| Starch | 0.092 |
| Dry powdered silica gel | 0.03 |
| Magnesium stearate | 0.003 |

The tablets may be employed at, for example, a dosage of from 2 to 6 per day.

We claim:
1. A member of the class consisting of iminodibenzyl compounds of the general formula:

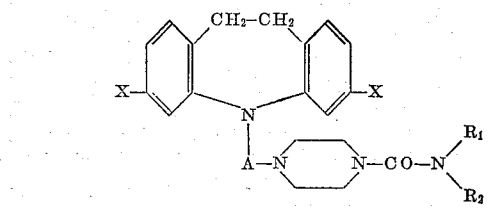

wherein A represents a saturated aliphatic hydrocarbon group containing 2 to 4 carbon atoms with at least two carbons atoms between the nitrogen atom of the iminodibenzyl nucleus and that of the piperazine nucleus, the symbols X are the same and represent a member of the class consisting of hydrogen and halogen atoms, $R_1$ and $R_2$ each represent a member of the class consisting of a hydrogen atom and a lower alkyl group, and compounds of the above formula wherein no more than two of the carbon atoms of the piperazine nucleus carries a lower alkyl group, and their non-toxic acid addition salts.

2. 5-(3-4'-carbamoyl - 1' - piperazinylpropyl)iminodibenzyl.

3. 5-(3-4'-methylcarbamoyl-1' - piperazinylpropyl)iminodibenzyl.

4. 5-(3-4'-dimethylcarbamoyl - 1' - piperazinylpropyl)iminodibenzyl.

5. 3,7-dichloro-5-(3-4' - carbamoyl - 1' - piperazinylpropyl)iminodibenzyl.

6. 3,7-dichloro-5-(3-4'-methylcarbamoyl - 1' - piperazinylpropyl)iminodibenzyl.

7. 5-(3-2',5'-dimethyl-4'-carbamoyl - 1' - piperazinylpropyl)iminodibenzyl.

8. 5-(3-4'-carbamoyl-1'-piperazinyl - 2 - methylpropyl)iminodibenzyl.

No references cited.